G. KERR.
LAMP BURNER.
APPLICATION FILED NOV. 11, 1908.
929,225.
Patented July 27, 1909.
2 SHEETS—SHEET 1.
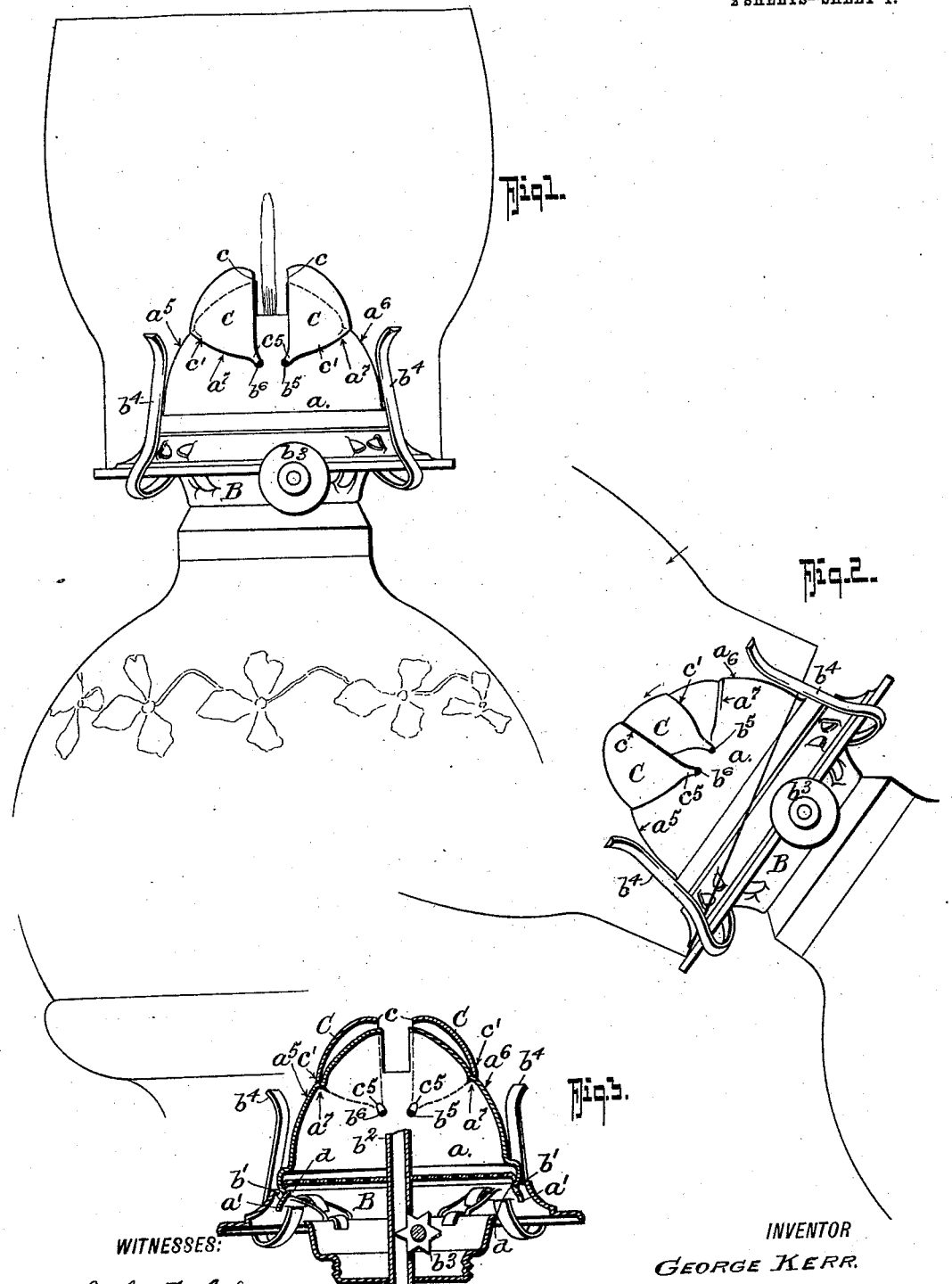
WITNESSES:
John T. Schrott
Charles H. Wagner
INVENTOR
GEORGE KERR.
BY
Fred G. Dieterich & Co.
ATTORNEYS.

G. KERR.
LAMP BURNER.
APPLICATION FILED NOV. 11, 1908.
929,225.
Patented July 27, 1909.
2 SHEETS—SHEET 2.
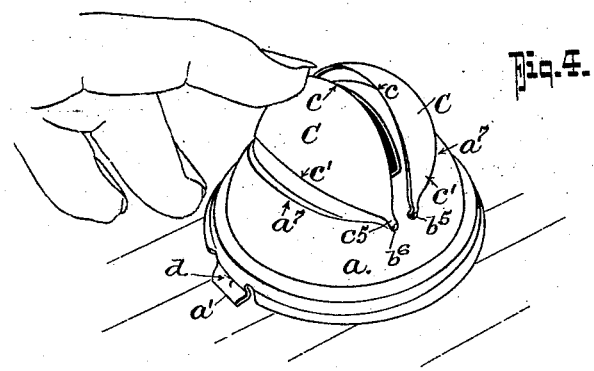
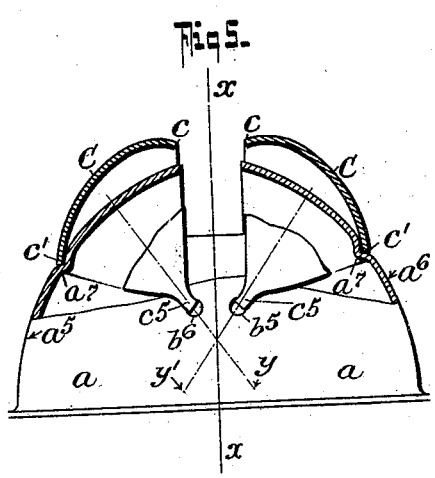
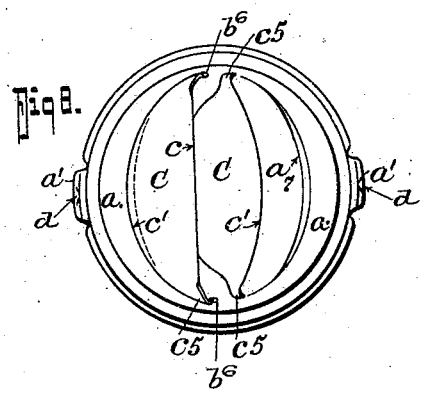
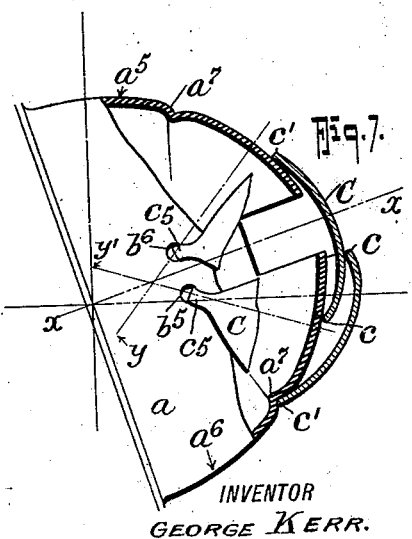
WITNESSES:
John T. Schrott
Charles H. Wagner
INVENTOR
GEORGE KERR.
BY
Fred G. Dieterich & Co
ATTORNEYS.

UNITED STATES PATENT OFFICE.

GEORGE KERR, OF ASTORIA, OREGON.

LAMP-BURNER.

No. 929,225.  Specification of Letters Patent.  Patented July 27, 1909.

Application filed November 11, 1908. Serial No. 462,182.

*To all whom it may concern:*

Be it known that I, GEORGE KERR, residing at Astoria, in the county of Clatsop and State of Oregon, have invented certain new and useful Improvements in Lamp-Burners, of which the following is a specification.

This invention relates, generally, to that type of lamp burners having muffling devices for extinguishing the lamp flame as the lamp is tilted when carelessly holding the same, or when it upsets, and it more specifically comprehends certain improvements on the construction of lamp burner shown in my Patents No. 821,171 dated May 22, 1906 and 822,457 dated June 5, 1906.

Briefly stated, the construction of burner disclosed in my two patents above referred to, embodies a pair of muffler plates or valves that are pivotally mounted on the dome or crown portion of the burner in such manner that they swing by gravity, over the flame slot when the lamp is tilted, to close off the slot and extinguish the flame.

In the practical use of the types of burners shown in my patents aforesaid, it has been developed that while the parts as combined therein are generally reliable in their action, yet at times they fail to act with that positiveness and quickness necessary to reduce the danger of explosion to absolute minimum.

In the patented forms of my burner the valves or muffler plates are joined to the burner dome by fixed pivots, in the nature of screw studs, and the plates, when arranged to swing over to frictionally interlock with the dome, as in my Patent No. 821,171, have such large bearing contact with the dome and with each other that the opposing valves at times become interlocked to such an extent as to make it difficult to separate them without bending them, the curvature of the two plates and the burner dome being relatively such, that a slight bending of the plates renders them sufficiently off, in shape, to hold them from that delicate pivotal connection necessary to insure a perfect action of the plates at all times. Again, in the forms of burner shown in my two patents referred to, rests or stops are formed on the burner dome, either as a screwstop shown in my Patent No. 822457, or by forming the burner dome with raised projections as in Patent No. 821171. These rests or stops however are so arranged that the plates as they fall back engage them at one point only, midway their pivotal ends. This method of normally supporting the plates I have also found as not meeting all that is desired to insure a proper working of the parts, for the reason that being supported at one point only and that midway the ends, when the pivots become slightly out of uniform condition or the plates are slightly bent, the said plates fail to swing true when the lamp is tilted and hence imperfect closure of the plates over the flame slot occurs.

My present invention has for its object to so perfect the type of burner shown in my patents referred to that the objections to the other burners referred to will be overcome and the muffler or valve plates combined and so shaped relatively to the burner dome, that the plates will positively close over the flame slot or fall back, as the tilt of the lamp may make desirable, and danger of imperfect swinging or unnecessary bending of the plates with each other, or with the burner dome, avoided.

Another object of my invention is to provide a construction of the parts that constitute the same, so they can be easily manufactured at a cost much less than is required for making the other forms of my burner referred to.

With the above and other objects in view that will hereinafter appear, my present invention comprehends an improved coöperative arrangement and shapes of the burner dome and the plates, whereby the plates, when at their normal position, are so held that in closing over the dome slot they engage the dome with their edges only, and the plates mounted on the dome by shiftable pivotal connections whereby they will have relatively independent movement with respect to the burner dome and to each other and such that in contacting, the outermost plate will yield sufficiently to avoid danger of a frictional interlocking of the plates with each other and with the dome.

In its more subordinate features, my present invention includes, with the peculiarly shaped plates and the pivotal mounting thereof a dome having rest portions that extend substantially entirely across the top so as to form a seat for substantially the full length of the lower edge of the plates, other minor details of parts being also included, all of which will be hereinafter fully explained, specifically pointed out in the appended claims and illustrated in the accompanying drawings, in which:—

Figure 1, is a side elevation, showing a portion of a lamp with my improved burner, the muffler or extinguishing plates being in the normal position. Fig. 2, is a similar view, the lamp being tilted and the plates shown as closing the flame slot. Fig. 3, is a vertical section of my improved construction of burner, the muffler plates being in the normal position, that is, resting on the transversely extended horizontal seats formed on the burner hood. Fig. 4, is a detail perspective view of the burner and it illustrates more particularly the transversely extended horizontal seat for the lower edge of the muffler plates. Fig. 5, is a vertical diagrammatic section that illustrates the muffler plates in their normal position and the relative curvature of the said plates and the burner crown. Fig. 6, shows the relative positions of the two plates when the burner is partly tilted. Fig. 7, is a similar view showing the position of the plates when the burner is further tilted. Fig. 8, is a plan view of the burner, one of the muffler plates being shown as swung over the burner slot to the better illustrate the transverse seat or rest for the swung over plate.

In my present construction of burner, the hood portion $a$ is especially constructed for coöperating with my new design of muffler plates and the lower part of the said hood portion, which is stamped up of a single piece of sheet metal, has integral pendent and diametrically arranged fingers $a'$—$a'$ for springing through the oppositely disposed slots $b'$—$b'$ in the burner base B that carries the chimney clamps $b^4$, the wick tube $b^2$, and wick adjuster devices $b^3$, the general arrangement of which is clearly shown in Figs. 1, 2, and 3.

As before stated, one of the serious objections in the use of my patented burners is that at times the plates frictionally bind on each other and on the dome. This objection I have overcome by peculiar shaping of the burner dome and the plates and the manner of pivotally mounting the plates.

By referring now more particularly to Fig. 5, it will be noticed that the slotted crown portion of the hood $a$ is curved on two different arcs, the curved portion $a^5$ at one side of the vertical axis of the burner, designated $x$ on the drawings, say the left side, is curved on an arc with $y$ as the center, said point $y$ being on the right side of the axis $x$, the other curved portion $a^6$ being struck on an arc with the center $y'$ at the left of the axis $x$.

C—C designate the muffler plates of like construction, each of which has its lower edge portion $c'$ transversely curved, parallel with the transverse curvature of the hood, so that the said lower edge although capable of closely fitting over onto the hood, will move freely thereover without danger of binding thereon.

In the present form of my invention, I have formed the hood at each side of the slot, with a transverse seat or ledge $a^7$—$a^7$ each of which extends across from one of the pivotal points to the other pivot of its respective blade C, so as to provide, as it were, a solid transverse rest for substantially the entire length of the lower edge $c'$ of the plate C. This feature is an advantageous one as it holds the plates in such uniformity of position with respect to the pivotal connections (presently explained) that they yield instantly and swing forwardly without danger of wabbling and binding on the dome, when the lamp is tilted in any direction.

Each plate in transverse direction is curved on an arc eccentric to the curvature of the dome and the inner ends $c$—$c$ are curved eccentrically with respect to the curvatures $a^5$—$a^6$ the curvatures being such that in swinging over the slot in the hood $a$ only the upper and lower edges $c$ and $c'$ of the blades contact with the hood and only the upper edges $c$ of the blades contact with each other.

To further provide for overcoming danger of frictional interlocking of the plates C—C when the lamp tilts or falls, I form the ends of the plates with inwardly bent hooks $c^5$—$c^5$, and these are arranged to pass through elongated apertures $b^5$—$b^6$ in the burner hood and to interlock therewith.

By pivotally connecting the plates to the hood in the manner stated and shown, I am able to stamp the plates with end extensions capable of being bent into the apertures $b^5$—$b^6$ to form the pivots thereby providing the plates and effecting the fastening of the same to the hood at a minimum expense.

It will be noticed that the apertures $b^5$—$b^6$ are so arranged that the one $b^5$ is on a line radial from the point $y'$ while the other aperture $b^6$ is on a line radial from the point $y$. By thus arranging the apertures $b^5$—$b^6$ and providing as it were, an automatically shiftable pivotal connection for the blades, it is manifest the plates have sufficient free play radially with respect to the crown of the hood A and each other that in passing from the position shown in Figs. 5 to 6 and from 6 to 7, the plates C—C are sufficiently flexible to overcome such frictional binding that might tend to interlock them to such an extent as to prevent instantaneous shifting of the said plates when the lamp is tilted in any direction.

It will also be clear that in my present form, the burner hood may be stamped out of a single piece and with the pivot apertures thereon and the plates C—C likewise stamped up with the extensions that are bent back through the pivot apertures, thus doing away with the extra cost of pivot studs and at the same time provide a special form of pivot connections, the advantages of which have been explained.

To overcome danger of the hood portion A of the burner from becoming separated from the base or wick holder portion of the burner when the lamp falls or receives a jar sufficient to throw the spring fingers $a'$—$a'$, of the slots $b'$—$b'$, I form the said fingers $a'$—$a'$ with indentations that produce the ribs $d$—$d$, see Fig. 3, that act as a positive locking means for holding the hood onto the base or wick portion of the burner.

Having thus described my invention, what I claim is:

1. In combination with the slotted dome having two sets of pivot apertures, one set at each side of the flame slot; two plates, each of which is independently and loosely pivoted in a set of the pivot slots and adapted for swinging over the dome slot, and freely under each other.

2. A lamp burner having an extinguisher, that comprises a plate shaped to swing over the flame slot, said plate having a pivotal connection with the dome whereby it will be caused to swing over the flame slot when the lamp is tipped, the plate having such curvature relatively to the slotted crown of the burner, whereby its upper and lower edges only contact with the said slotted burner crown.

3. A lamp burner having a pair of oppositely movable plates shaped to swing over the flame slot, each plate being hinged to the burner top by an automatically shiftable pivotal connection, each of said plates having such curvature relatively to the burner top whereby the upper and lower edges thereof only engage the burner top and with each other.

4. In a lamp burner of the character described, a pair of oppositely disposed plates pivotally mounted on the slotted dome portion of the burner, either of said plates being adapted to close over the dome slot when the lamp is tipped in either direction and shaped to frictionally engage the dome and each other with their upper and lower edges only.

5. The combination with the slotted dome portion of the burner, that portion of the dome at one side of the slot being curved on an arc whose center is at the other side of the slot, the other portion of the dome being likewise curved; of a pair of oppositely disposed plates pivotally mounted on the dome to swing over the flame slot therein, each of said plates being curved eccentrically to the curvatures of the dome for the purposes specified.

6. The combination of the slotted dome, and the pair of oppositely disposed plates pivotally mounted on the dome and shaped to swing over the flame slot in the burner dome when the lamp is tipped over, said dome having a seat at each side of the slot that extends substantially from one pivot point to the other pivot point in each set of pivots, with which the lower edges of the plates engage when swung back to their normal or open position.

GEORGE KERR.

Witnesses:
JAMES VERNON,
MATT STRAL.